(12) United States Patent
Fleeter

(10) Patent No.: US 6,317,029 B1
(45) Date of Patent: Nov. 13, 2001

(54) IN SITU REMOTE SENSING

(75) Inventor: Richard David Fleeter, Reston, VA (US)

(73) Assignee: AeroAstro, LLC, Herndon, VA (US)

( * ) Notice: Subject to any disclaimer, the term of this patent is extended or adjusted under 35 U.S.C. 154(b) by 0 days.

(21) Appl. No.: 09/130,854

(22) Filed: Aug. 7, 1998

(51) Int. Cl.$^7$ ..................................................... H04Q 5/22
(52) U.S. Cl. ................. 340/10.32; 340/539; 340/870.02; 340/870.03; 455/12.1
(58) Field of Search ................................ 340/10.32, 539, 340/870.02, 870.03; 455/12.1; 235/382, 492

(56) References Cited

U.S. PATENT DOCUMENTS

| | | | | |
|---|---|---|---|---|
| 5,376,778 | * | 12/1994 | Kreft | 235/382 |
| 5,758,260 | * | 5/1998 | Wiederman | 455/12.1 |
| 5,815,071 | * | 9/1998 | Doyle | 340/439 |
| 6,100,806 | * | 8/2000 | Gaukel | 340/573.4 |
| 6,128,469 | * | 10/2000 | Zenick, Jr. et al. | 455/12.1 |

OTHER PUBLICATIONS

Space Mission Analysis And Design, Second Edition, Wiley J. Larson and James R. Wertz (editors), Chapter 22, Design of Low–Cost Spacecraft, Rick Fleeter and Richard Warner, AeroAstro, pp. 782–785. Published jointly by Microcosm, Inc. 2601 Airport Drive, Suite 230, Torrance, California 90505 USA and Kluwer Academic Publishers, P.O.Box 17, 3300 AA, Dordrecht, The Netherlands. Copyright 1992 W.J.Larson and Microcosm, Inc. ISBN 1–881883–01–9 (pb.) (acid–free paper) ISBN 0–7923–1998–2 (hb.) (acid–free paper).

* cited by examiner

Primary Examiner—Brian Zimmerman
Assistant Examiner—Yves Dalencourt
(74) Attorney, Agent, or Firm—Robert M. McDermott, Esq.

(57) ABSTRACT

The in situ remote sensing system of this invention includes a plurality of sensors that are distributed about an area of interest, and a satellite communications system that receives communications signals from these sensors. The satellite communications system determines the location of each sensor at the time that the sensor transmits its communications signal, thereby facilitating the mapping of the value of the sensed parameter about the area of interest. In a preferred embodiment, the satellite communications system transmits a trigger signal to the sensors that are within the satellite antenna's field of view, and the sensors transmit only in response to the trigger signal. The sensors may be conventional active transmitters or passive transponders that receive their operating energy from a received trigger signal. The sensing devices within the sensor may also provide the operating energy for the sensor using, for example, photocells, piezoelectrics, and thermocouples.

20 Claims, 5 Drawing Sheets

IN SITU REMOTE SENSING

BACKGROUND OF THE INVENTION

1. Field of the Invention

This invention relates to the field of satellite systems, and in particular to the field of remote sensing of events and parameters via satellite.

2. Description of Related Art

Satellites are often used to sense events that occur at remote locations. Weather satellites use optical and radar devices to sense the presence of clouds, lightning, and other atmospheric phenomena. Reconnaissance satellites use optical, infrared, and other sensing devices to detect occurrences of events on the earth's surface. Scientific satellites use a variety of sensing equipment to detect occurrences of events throughout the universe.

The cost of placing a satellite into orbit and subsequently controlling the satellite significantly increases the relative cost of each sensor in the satellite. Additionally, sensors designed for space must be robust, and require robust ancillary equipment to support their continued operation in a relatively harsh environment. As a result, the cost of placing a sensor in space is significantly higher than the cost of placing a similar sensor on the earth. The additional cost of placing the sensor into orbit, however, allows the sensor to cover a substantially greater area of the earth's surface. It also allows the detection of events in areas that are inaccessible or dangerous for direct placement of the detector.

Satellites can also be used to communicate information from individual sensing devices that are placed at remote locations. For example, weather buoys containing sensing equipment are placed at specific locations across the oceans, and the information from the sensing equipment is communicated via satellites to a centralized weather station. The "FireSat" system of reference [1] discloses the placement of transmitters in a forest. Each transmitter contains a thermocouple and has an associated unique identifier. When a forest fire occurs, the thermocouple turns the transmitter on and the transmitter transmits the unique identifier. A satellite receives the transmission and relays the transmission to a control station that coordinates the firefighting efforts based upon the location of each of the uniquely identified transmitters. These land-based remote sensing systems can be less costly to implement than satellite remote sensing systems, because the satellite need only contain communications equipment, rather than remote sensors designed for each type of phenomena being detected.

The conventional land-based remote sensing system presumes an a priori knowledge of the remotely placed sensors, and/or a unique identification of each sensor. Each uniquely identified thermocouple transmitter in the "FireSat" system, for example, has an associated assigned location, as does each ocean weather buoy. If the thermocouple transmitter in the forest is moved by a creature of the forest, or by a vandal, the transmission of its unique identifier will convey erroneous information, because the control station will direct the firefighting efforts to the original location of the transmitter. The satellite remote sensing system, on the other hand, only requires a knowledge of where the satellite is located and the orientation, or viewing angle, of the sensing device that is detecting the phenomena. The satellite remote sensing system, however, requires a particular sensing device (optical, radar, infrared, etc.) in the satellite for each of the phenomena being detected. To distinguish details of the event or phenomenon being sensed, the resolution of the satellite remote sensing system for each sensing device must also be high, which further adds to the high cost of such a system. The satellite remote sensing system is also subject to premature obsolescence. As time progresses, the infeasibility of replacing or augmenting the equipment on a satellite with newer technologies makes satellite remote sensing systems increasingly less competitive with land based remote sensing systems.

Therefore, a need exists for a remote sensing system that eliminates the need for a satellite that contains a sensing device for each sensed phenomena, and also eliminates the need to place sensing devices at predetermined locations. A need also exists for a remote sensing system that does not require a unique identification of each remote sensor. A further need exists for a high resolution sensing system that does not require high resolution sensing devices.

BRIEF DESCRIPTION OF THE INVENTION

The invention provides for the use of remote sensors that are distributed about the site of the phenomena being sensed, and a satellite system that determines the location of each sensor based upon the receipt of a transmission from the sensor. The remote sensor can be an autonomous transmitter or a transponder that emits a signal in response to the receipt of a triggering signal. The remote sensor may transmit its location explicitly, or its location may be determined by the satellite system based upon the characteristics of the received signals. By providing dynamic location determination means, the remote sensors may be arbitrarily located while assuring the proper association between the sensed event and the location of the sensed event. In a preferred embodiment, the remote sensors are designed to be of minimal complexity and cost, thereby allowing a multitude of sensors to be deployed to effect field measurements of phenomena about the area of interest. In this preferred embodiment, the resolution of the system is determined by the distribution of the low cost sensors, rather than by the resolution of a sensor that is deployed in a satellite.

DETAILED DESCRIPTION OF THE INVENTION

Figure 1:
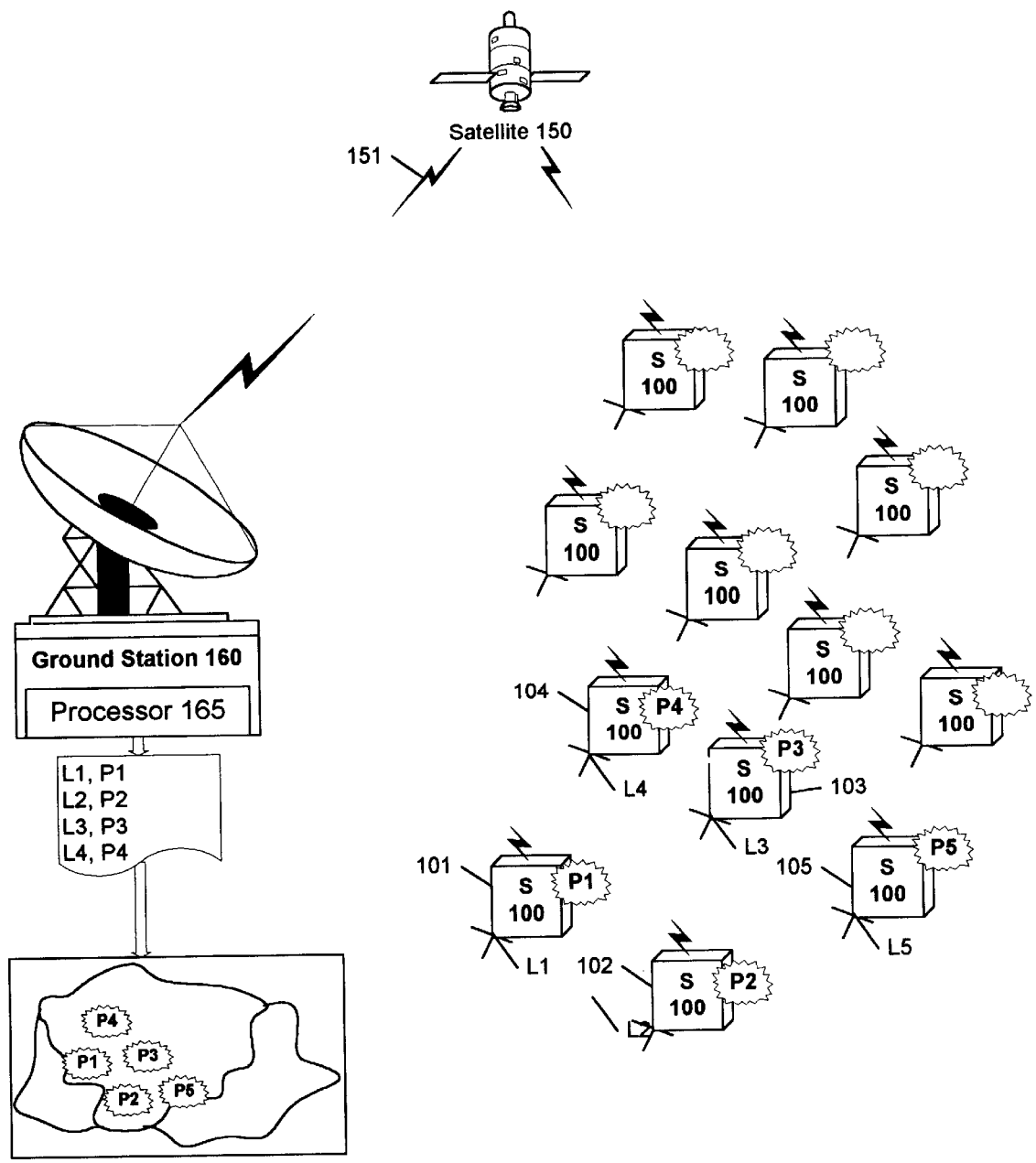
FIG. 1 illustrates an example remote sensing system in accordance with this invention.

FIG. 1 illustrates an example remote sensing system that includes a plurality of sensors 100, a satellite 150, and ground station 160. The satellite 150 and ground station 160 form a satellite communications system for relaying the information received at the satellite 150 from the sensors 100 to the ground station 160. Example sensors 101–105 of the plurality of sensors 100 are shown to be located at locations L1–L5 respectively. The sensors 100 are designed to measure a value of a parameter P. As illustrated in FIG. 1, example sensor 101 detects a value P1 of the parameter P; sensor 102 detects a value P2; sensor 103 detects a value P3; sensor 104 detects a value P4; and sensor 105 detects a value P5.

The parameter P may be, for example, temperature. Each sensor 101–105 in this example contains a means for detecting or measuring temperature. In the simplest example, each sensor 101–105 includes a thermocouple that is in an off state when the detected temperature is less than a particular value and is in an on state when the detected temperature is above the particular value. The value of each parameter P1–P5 in this example will be either "on" or "off", depending upon whether the temperature at each of the sensors 101–105 is above or below the particular value, respectively.

Each of the example sensors 101–105 communicates their respective parameter value P1–P5 to the satellite 150. In the two state example above, the parameter value may be communicated by the presence or absence of a transmission: receiving a transmission from a sensor signifies an 'on' state, otherwise, the sensor is assumed to be in the 'off' state. That is, a null transmission is used to convey a parameter value. As is common in the field of telemetry, the value of the parameter P may be a continuous value, and the sensor 100 communicates this value at a particular level of precision. In the 'on' off example, the level of precision is one bit of information. Conversely, the parameter P may be used to adjust an analog characteristic, such as the frequency, amplitude, or phase of the transmitted signal; in such an example, the level of precision is virtually unlimited.

The parameter P is not limited to a temperature measurement. Transducers are commonly available to convert a myriad assortment of parameters into an electrical characteristic. Thermodynamic transducers are available that measure thermodynamic and transport properties. Similarly, pressure, motion, and acceleration transducers are commonly available, as well as chemical transducers that can detect or measure the presence of particular chemicals or groups of chemicals, such as salinity testers, smoke detectors, carbon monoxide detectors, pollutant detectors, and the like. Radiation transducers of various types are also commonly available. Flux field measuring devices are also available that measure sunlight flux, charged particle flux, and neutral particle flux, and various transducers are commonly available for measuring properties of electromagnetic fields, such as the orientation and strength of the earth's magnetic field.

Note that by deploying the sensors in situ, parameters that are difficult or impossible to measure from space can be sensed. Additionally, each sensor 101–105 can be designed to the desired degree of accuracy and precision, independent of the satellite 150. In accordance with a preferred embodiment of this invention, the communication method and protocol from the sensors 100 to the satellite 150 and on to the ground station 160 is independent of the particular sensing device used, and independent of the parameter being measured. In this manner, the same satellite communications system can be used to remotely sense a variety of parameters. The same satellite communications system can be used when new transducer technologies become available, or when new situations arise that require in situ remote sensing. For example, in the field of microelectronic manufacturing (MEM), expectations of future technologies include the ability to provide mass-spectrometer capabilities on a single MEM chip. As new technologies are developed, the remote sensing systems in accordance with this invention can be configured to employ these new sensing technologies by deploying new sensors 100, rather than by launching new satellites 150 containing the new sensing technologies.

In accordance with this invention, the satellite communications system 150–160 includes he ability to determine the location of each sensor at the time that the sensor transmits. In the example of FIG. 1, sensors 101–105 are located at locations L1–L5 within an area of interest. The satellite communications system 150–160 determines each of the locations L1–L5 of the sensors 101–105 when they each transmit their detected parameter value P1–P5, respectively. In the case of a null transmission from one of the sensors 101–105, the satellite communications system 150–160 determines the location of the null-transmitting sensor as the last determined location of that sensor, or an estimated location of the null-transmitting sensor based upon prior movements of that sensor. Alternatively, the satellite communications system 150–160 can ignore nulltransmissions. In a preferred embodiment that uses a null transmission to convey a particular parameter value, the most benign value of the parameter is associated with a null transmission.

That is, for example, if the parameter being detected is whether the carbon monoxide level is above or below a particular value, a null transmission is associated with the level being below the particular value. In this manner, a non-benign detection effects a non-null transmission, from which the satellite communication system determines the most recent location of the sensor.

In a preferred embodiment, to minimize the cost and complexity of the satellite 150, the ground controller 160 includes a processor 165 that determines the location of each sensor 101–105 based on the signals 151 that are relayed from the satellite 150. By determining the location L1–L5 of each sensor 101–105 at the time that the each sensor 101–105 transmits its measured parameter value P1–P5, each measured parameter value can be associated with a corresponding location, as shown at the output of the processor 165 in FIG. 1. From these corresponding parameter values and locations, a map 170 of the occurrence of each parameter value about the area of interest can be produced. For example, each location L1–L5 may be represented by a coordinate or set of coordinates, such as a latitude and a longitude on the earth's surface. The map 170 is a conventional overlay of the parameter values P1–P5 at each coordinate upon a geographic representation of the area of interest. Other representations would be common to one of ordinary skill in the art. For example, isobars can be drawn representing locations having substantially the same parameter value, or differing colors or intensities of colors can be used that correspond to differing parameter values. Similarly, the map 170 may be configured to display changes of parameter values, rather than absolute parameter values.

Note that the location determination is dynamic, in that the determined location represents the actual location of each sensor 100 when each sensor 100 is transmitting. If the sensors 100 are mobile, the corresponding mapping 165 of parameter values P to locations L will change if either the parameter value P or the location L changes. In this manner, the map 170 will be continually updated to reflect these changing values. For example, floating sensors 100 that contain oil sensing devices can be deposited about the area of an oil leak at sea. These floating sensors 100 may be deposited about the area by dropping them from an aircraft as it traverses the area around and upon the oil slick. Each of the sensors 100 will report the presence or absence of oil at their location. The location of each sensor 100, and the location of the oil slick, will be affected by the wind and by the current of the water, but not identically. By maintaining a dynamic determination of the location and parameter value of each sensor 100, the map 170 will contain an accurate representation of the location and extent of the oil slick, as different sensors enter and leave the oil slick due to the influences of wind and current.

Note also that because the satellite communication system determines a location associated with each transmitted parameter directly, there is no need to identify each individual sensor 100 that is transmitting to the satellite. In the FireSat system, and the ocean buoy example, each sensor and buoy must be uniquely identified, because in each of these systems, each sensed parameter value P must be associated with a specific sensor before an association with a location is determined. That is, in a conventional system, a transmission signature uniquely identifies each transmitter. This transmission signature may be a characteristic of the signal itself, such as the frequency of the signal, or it may be an encoding contained within the signal, such as a transmission preamble that contains a unique pattern of bits that identify each transmitter. Based upon the transmission signature, the conventional system determines the location of the particular transmitter. The generation of a unique identifier per transmitter increases the cost of each transmitter. In a preferred embodiment of this invention, each transmitter need not have a unique transmission signature. Each transmitter may be identical, thereby achieving the economic advantages of mass production.

Figure 2:
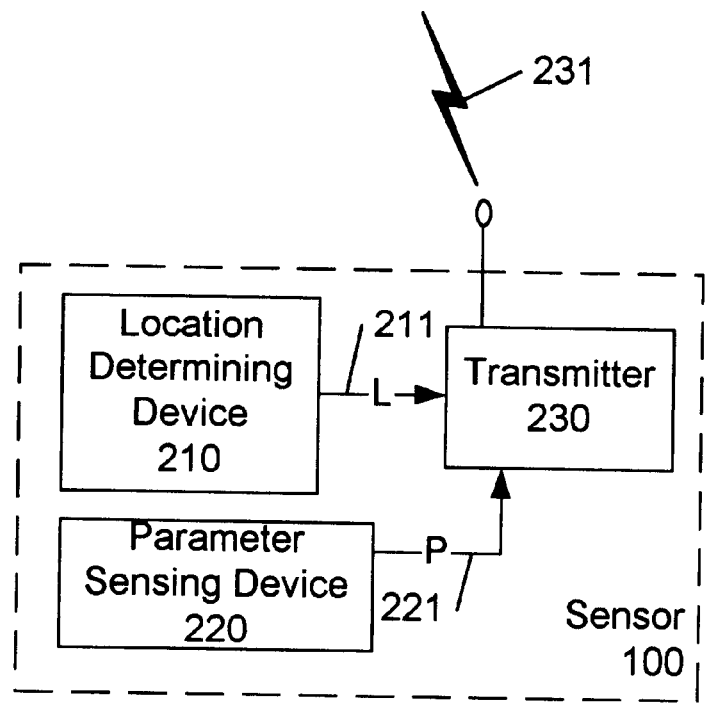
FIG. 2 illustrates an example sensor that includes a location determining device and a parameter sensing device in accordance with this invention.

A variety of techniques can be employed to determine the location of the sensor when the sensor transmits. FIG. 2 illustrates a direct determination method, wherein the sensor 100 includes a location determining device 210, as well as the parameter sensing device 220. A transmitter 230 receives the location L 211 from the location determining device 210, and the parameter value P 221 from the parameter sensing device 220, and communicates a communications signal 231 that contains an encoding of both the location L 211 and the parameter value P 221. As noted above, a particular parameter value 221 may effect a null transmission, wherein neither the location 211 nor the parameter value 221 is transmitted. The location determining device 210 can be any commonly available location determining device, such as a Global Positioning System (GPS) device, an inertial navigation device, a LORAN device, and the like. The satellite communications system 150–160 determines the coordinates of the location of the transmitter at the time of transmission by decoding the location 211 from the communications signal 231.

Figure 3:
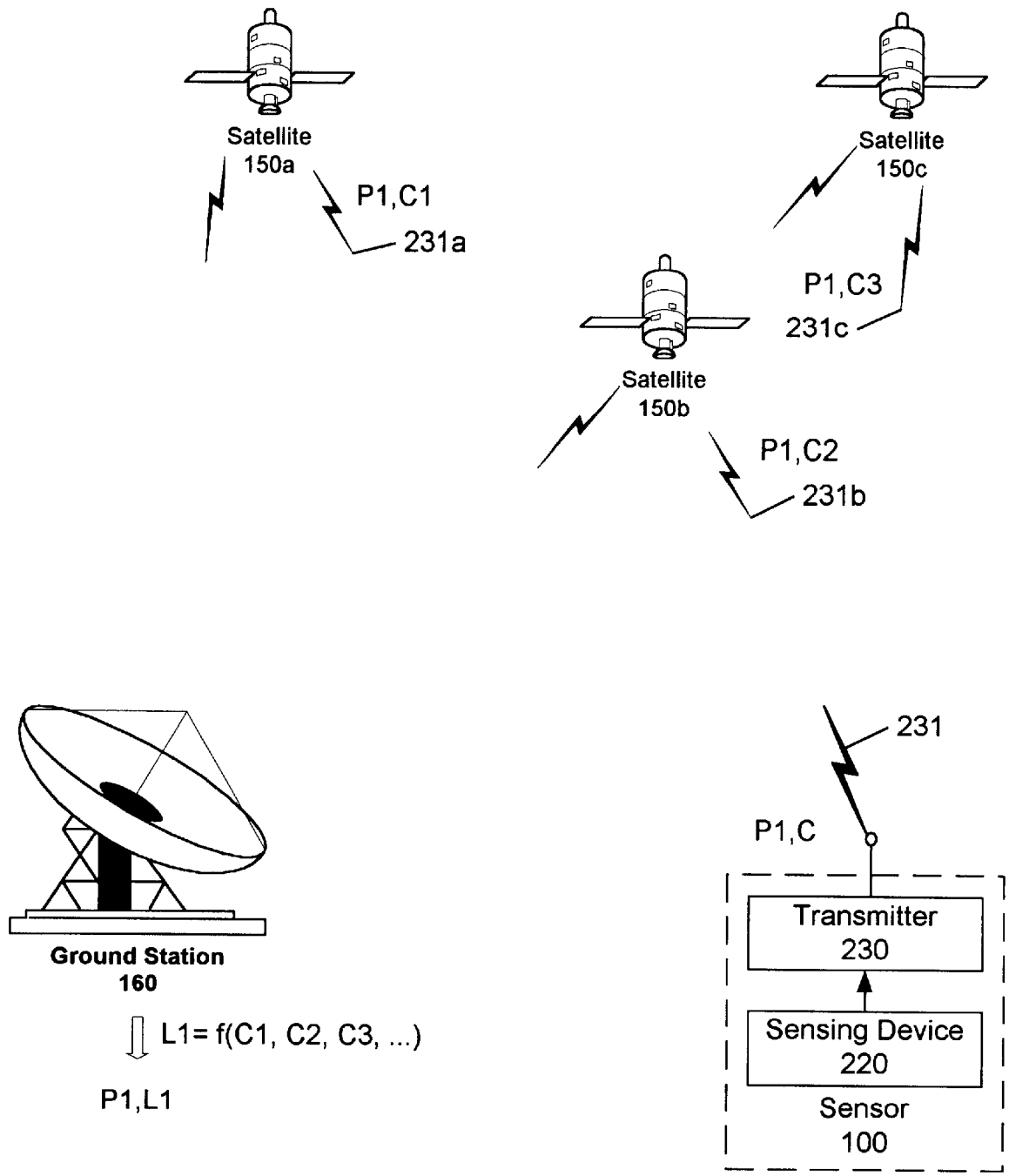
FIG. 3 illustrates an example of the use of multiple satellites to facilitate the determination of the location of a sensor in accordance with this invention.

FIG. 3 illustrates the use of multiple satellites 150*a*, 150*b*, 150*c* to determine the location of a sensor 100. The sensor 100 transmits a communications signal 231 that contains an encoding of the parameter value PI and that has signal characteristics C. The signal characteristics C may include the frequency, phase, amplitude, and time of the transmitted communications signal 231.

As the communications signal 231 propagates to the satellites 150*a*, 150*b*, 150*c*, the signal characteristics C change, relative to each satellite. For example, the time of arrival of the communications signal 231 at each satellite will in most cases be different at each satellite, and different from the time of transmission. Similarly, the frequency of the communications signal 231 that is received at each satellite will differ, depending upon the relative motion of each satellite relative to the sensor 100 (the Doppler effect). Each satellite 150*a*, 150*b*, 150*c* communicates a relayed signal to the ground station 160, and this relayed signal contains the modified characteristics C1, C2, and C3 of the communications signal 231*a*, 231*b*, and 231*c* as it was received at each satellite 150*a*, 150*b*, and 150*c*, respectively. These characteristics may be explicitly or implicitly communicated to the ground station 160. For example, the differing received frequencies may be communicated by merely relaying the communications signal 231*a*, 231*b*, 231*c* to the ground station 160 and having the ground station 160 determine the relative frequency shifts based on these received communications signals 231*a*, 231*b*, 231*c* from each satellite 150*a*, 150*b*, 150*c*. As would be evident to one of ordinary skill in the art, the frequency of the received communications signals from each satellite will also be affected by the relative motion of each satellite relative to the ground station 160, and must be compensated for in the determination of the frequency shifts at each receiving satellite. Alternatively, each satellite 150*a*, 150*b*, and 150*c* may determine the pertinent characteristics of the received communications signal 231*a*, 231*b*, 231*c* and explicitly communicate the determined characteristics C1, C2, C3 to the ground station 160. For example, each satellite may append the time of receipt of the communications signal 231 at the satellite to the signal that is relayed to the ground station 160. The ground station 160 determines the coordinates of the location of the transmitting sensor 100 based upon these received signal characteristics C1, C2, C3 using techniques that are common in the art. For example, if the time of receipt at each satellite is identical, the sensor 100 must lie along a loci of points that are equidistant from each satellite. Under typical conditions, the loci of points that are equidistant from each of four or more satellites is a single point or a loci of points about a small area. Note that the individual satellites 150*a*, 150*b*, 150*c* may, in fact, be a single satellite 150 at different locations over time. The frequency shift of the communications signal 231*a*, 231*b*, 231*c* at each of these different locations, for example, can be used to determine the location of the transmitting sensor 100, particularly if the transmitting frequency at the sensor 100 is known.

Figure 4:
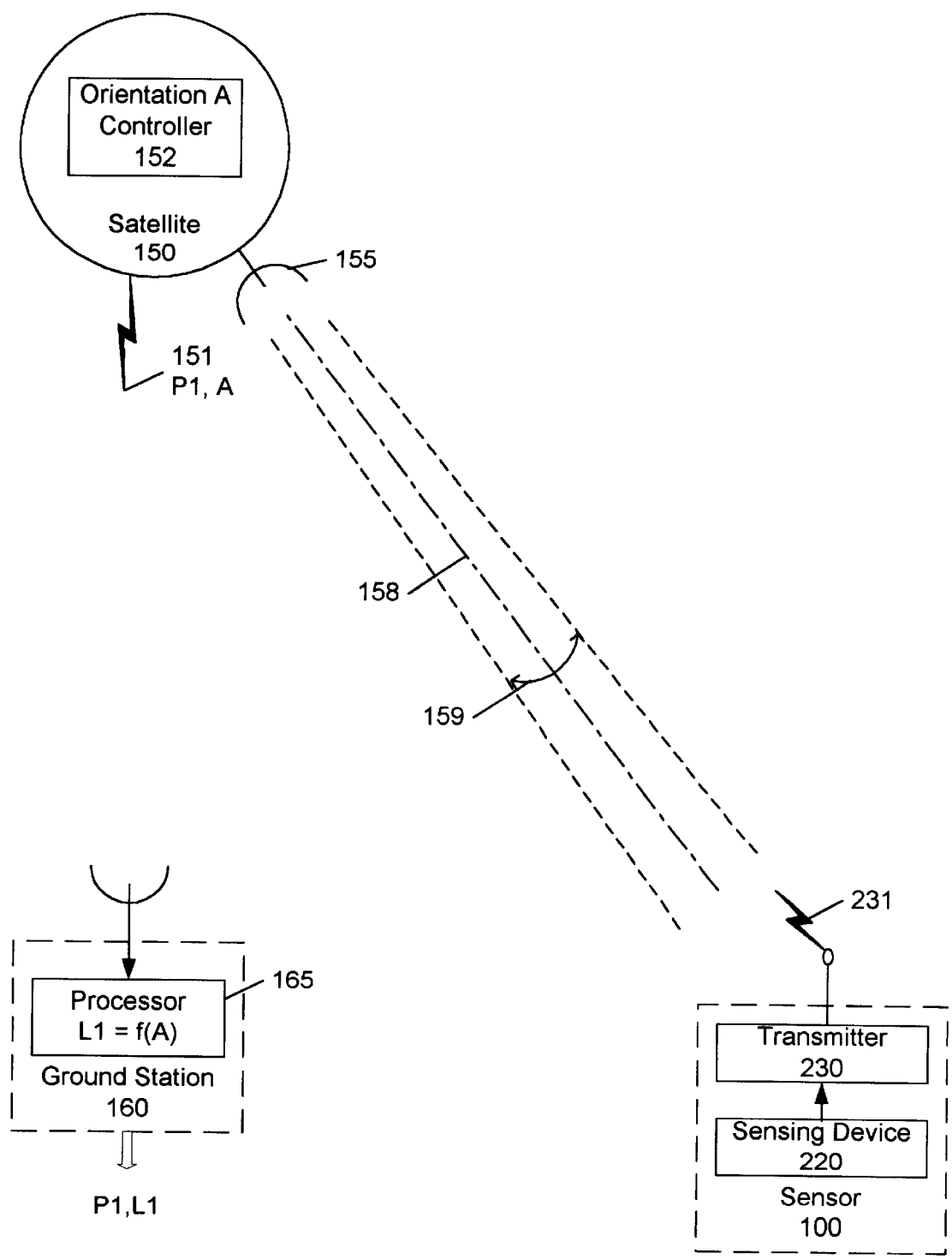
FIG. 4 illustrates an example of a directional antenna on satellite to facilitate the determination of the location of a sensor in accordance with this invention.

In a preferred embodiment, the satellite 150 includes a high-gain directional antenna. By using a high gain antenna at the satellite 150, the transmit power of the sensor 100 can be substantially reduced, thereby substantially reducing the cost of the sensor 100. By definition, a high gain antenna is a directional antenna. The high gain is achieved by focusing the field of view of the antenna along an axis of orientation of the antenna. Signals, including noise, outside the field of view of the antenna are substantially attenuated, thereby providing for a higher signal to noise ratio for those signals within the field of view. A directional antenna also facilitates the determination of the location of a sensor 100, because if the satellite 150 receives the communications signal 231 from the sensor 100, the sensor 100 must lie within the directional antenna's field of view. FIG. 4 illustrates an example of a directional antenna 155 on the satellite 150 to determine of the location of a sensor 100. The directional antenna 155 is oriented along an orientation axis 158, and is designed to have a field of view 159 that about the orientation axis 158. The satellite 150 contains an orientation controller 152 that controls the orientation A of the antenna 155. As is common in the art, an array of high gain antenna elements may be distributed about the satellite 150, and the orientation controller 152 controls the orientation A via the selection of one or more of the high gain elements. Upon receipt of a communications signal 231 from the sensor 100, the satellite 150 appends the orientation A of the orientation axis 158 at the time of receipt of the signal 231 to the signal 151 that is relayed to the ground station 160. The processor 165 of the ground station determines the location of the sensor 100, based on the location of the satellite 150 and the angle A of the orientation axis 158 of the antenna 155. For example, if the sensor 100 is known to be at a particular altitude, then the intersection of the orientation axis 158 with a spherical surface defining this altitude defines the location of the sensor 100. Alternatively, the aforementioned frequency or time differential between the transmission and reception of the communications signal 231 can be used to determine the distance between the satellite and the sensor 100, and the point along the orientation axis at this distance from the satellite defines the location of the sensor 100. Also, the aforementioned use of multiple satellites, each having a directional antenna, can be used to determine the location of each, sensor 100, using conventional radio direction finding techniques.

Figure 5:
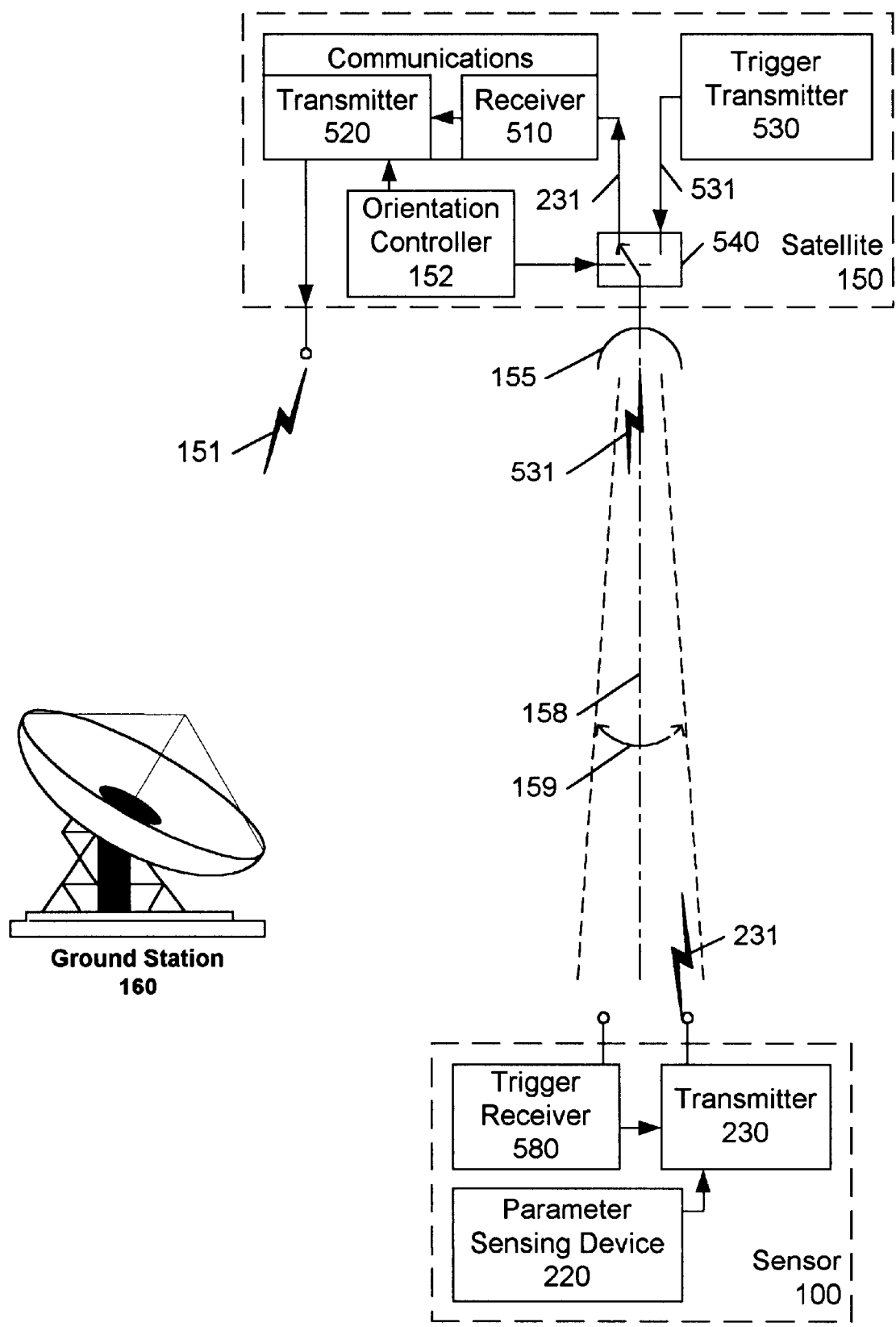
FIG. 5 illustrates an example of a remote sensor that responds to a trigger signal that is transmitted from a satellite in accordance with this invention.

FIG. 5 illustrates a remote sensor 100 that responds to a trigger signal that is transmitted from the satellite 150. The satellite 150 includes a communications receiver 510 and transmitter 520 for relaying the communications signal 231 from the sensor 100 to the ground station 160, and a trigger transmitter 530 for transmitting a trigger signal 531 to the sensor 100. To minimize the transmit power requirements, the trigger transmitter 530 transmits the trigger signal 531 to the sensor 100 via the directional antenna 155. The orientation controller 152 controls the orientation of the directional antenna 155, and controls a switch 540 that switches the directional antenna 155 between the trigger transmitter 530 and the communications receiver 510. The orientation controller 152 also communicates information concerning the orientation of the directional antenna 155 to the ground station 160 via the communications transmitter 520.

The sensor 100 in FIG. 5 includes a trigger receiver 580 that receives the trigger signal 531 whenever the sensor 100 is within the field of view 159 of the directional antenna 155. Upon receipt of the trigger signal 531, the transmitter 230 of the sensor 100 transmits a communications signal 231, in dependence upon the value of the parameter that is sensed by the parameter sensing device 220.

The use of a directed trigger signal 531 to trigger the transmission of a communications signal when the sensor 100 is within the field of view 159 of the satellite 150 provides a number of advantages. The power utilization of the sensor 100 is substantially reduced by constraining the transmission of a communications signal 231 to only those intervals of time that the satellite antenna 155 is able to receive the communications signal 231 from the sensor 100. The probability of interference among the plurality of sensors 100 is also substantially reduced, because only those sensors 100 that are within the field of view 159 of the satellite 150 will receive and respond to the trigger signal 531. In a preferred embodiment of the in situ remote sensing system, the sensors 100 are each designed so as to minimize the likelihood of interference among them. For example, each sensor 100 can be designed to conform to the common 'listen before transmit' broadcast protocol. Each sensor 100 transmits only when no other sensor 100 is already transmitting; in this protocol, interference is reduced to the rare occasion of two sensors initiating a transmission at exactly the same time. Other techniques of interference minimization techniques are common in the art. In a preferred embodiment, each sensor 100 transmits using a CDMA (Code Division Multiple Access) transmission method. The CDMA transmission protocol also reduces the interference to the rare occasion of two sensors simultaneously initiating a transmission, but does not require that each sensor 100 contain a receiver for determining whether another sensor is transmitting.

As is common in the art of transponders, the sensor 100 of FIG. 5 can use the power contained in the received trigger signal 531 to provide the power to transmit the communications signal 231, thereby eliminating the need for a discrete power supply, such as a battery, within the sensor 100. In a conventional transponder, the receiver 580 is a high-Q resonant circuit that is tuned to the frequency of the trigger signal 531. Upon receipt of the trigger signal 531, the high-Q resonant circuit contains the energy required to power the sensor 100. In a simple transponder of FIG. 6, the function of the receiver 580 and the transmitter 230 of FIG. 5 is effected by a single high-Q resonant circuit 680, and the sensor 220 is configured to affect the value of Q in response to the sensed value of the parameter. For example, at high-Q, the resonant circuit will continue to oscillate after the trigger signal 531 ceases. The continued oscillation forms the communications signal 231. The directional antenna 155 of FIG. 5, being a high gain antenna, detects this continued oscillation in response to the trigger signal. At low-Q, the resonant circuit is damped, and the oscillation ceases soon after the trigger signal 531 ceases and effects a null transmission in response to the trigger signal 531.

Figure 6:
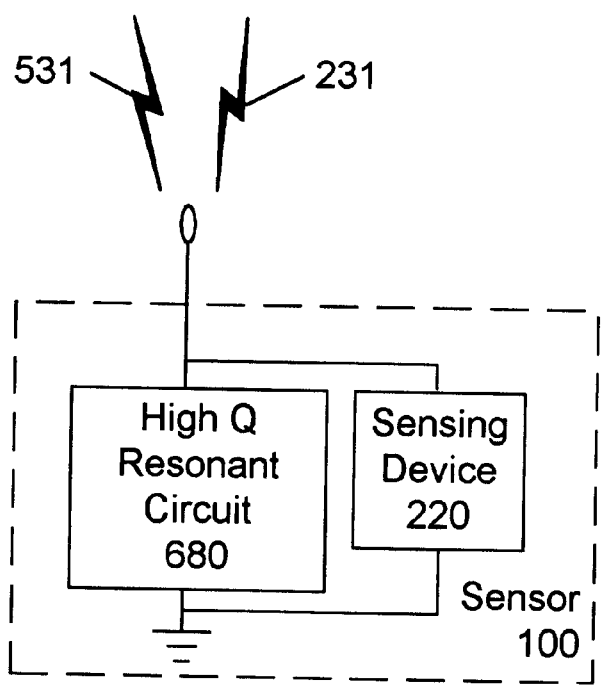
FIG. 6 illustrates an example transponder that uses a high-Q resonant circuit to receive and respond to a trigger signal that is transmitted from a satellite in accordance with this invention.

The transponder of FIG. 6 may be further simplified if the parameter being sensed is the trigger signal from the satellite. The high-Q resonant circuit 680 will be energized when it is triggered; therefore, the high-Q resonant circuit 680 can also be used to sense the trigger signal. In this manner, the sensor 100 may consist only of a single high-Q resonant circuit 680 that is resonant at the frequency of the trigger signal. With nano-technology techniques commonly available, such a sensor 100 can be made extremely small in size, light in weight, and low in cost.

In an example embodiment, such sensors 100 may be deployed in large quantities by an aircraft into the jet stream, and the satellite communications system 150–160 can be used to map the speed, volume, and direction of the jet stream over time. Similarly, the sensor 100 may be designed to attach itself to particular elements or forms of matter, and the satellite communications system 150–160 used to track the propagation of these particular elements or forms of matter.

The sensor 100 of FIG. 6 receives the power to transmit the communications signal from the trigger signal. Another method of providing the energy required to power a sensor 100 of FIGS. 1–5 is via the sensing device 220. If the sensor 100 is sensing light, for example, the sensing device 220 may be an array of photocells. When the light is above a particular level, the output of the photocells powers the transmitter 230; when there is insufficient light, a null transmission results. Similarly, thermal sensing devices generate an electromotive force in response to heat, piezoelectric devices generate an electromotive force in response to a mechanical force, and so on.

It should also be noted that, consistent with this invention, the communications signal that is transmitted to the satellite may be a reflection of a signal that is received from another source. For example, the resonant circuit 680 may be energized by a trigger signal that is emitted from a source that is not located at the satellite, such as a trigger generating system that is deployed in the same area of interest as the sensors 100. Also, the communications signal that is transmitted to the satellite need not be constrained to a signal in the radio-frequency spectrum. In another preferred embodiment, the sensor 100 is designed to emit light energy, using for example, different colors of light to encode the value of the parameter being sensed. In a light-emitting embodiment that is analogous to FIG. 6, the high-Q resonant circuit 680 is an optical device that reflects light if the sensing device 220 senses a particular value, and does not reflect light otherwise. The antenna 155 and receiver 510 in this embodiment are configured to receive the reflections of light from each sensor 100.

The foregoing merely illustrates the principles of the invention. It will thus be appreciated that those skilled in the art will be able to devise various arrangements which, although not explicitly described or shown herein, embody the principles of the invention and are thus within its spirit and scope. For example, FIG. 2 shows a location determining device 210, such as a GPS device, wholly contained within the sensor 100. A GPS device comprises the equipment necessary to receive the GPS signals and the equipment necessary to determine a coordinate based upon these received GPS signals. To reduce the overall costs, each sensor 100 may only contain the necessary equipment to receive the GPS signals, and the ground station 160 would contain the coordinate determination equipment. The received GPS signals would be communicated directly to the satellite communications system 150–160 via the transmitter 230 and subsequent converted to a location coordinate by the commonly used, and easily accessible, equipment at the ground station 160. Similarly, in this and the previous examples, a majority of the processing is effected at the ground station 160. As would be evident to one of ordinary skill in the art, this processing could be distributed between the ground station 160 and the satellite 150. In general, however, the ease of access to equipment at the ground station 160, and the cost per pound to launch a satellite 150 favors the distribution of as much processing as possible to ground station 160.

REFERENCE

1. Space Mission Analysis And Design, Second Edition, Wiley J. Larson and James R. Wertz (editors), Chapter 22, Design of Low-Cost Spacecraft, Rick Fleeter and Richard Warner, AeroAstro, pages 782–785. Published jointly by Microcosm, Inc. 2601 Airport Drive, Suite 230, Torrance, Calif. 90505 USA and Kluwer Academic Publishers, P.O. Box 17, 3300 AA, Dordrecht, The Netherlands. Copyright 1992 W. J. Larson and Microcosm, Inc.

ISBN 1-881883-01-9 (pb.) (acid-free paper)
ISBN 0-7923-1998-2 (hb.) (acid-free paper)

What is claimed is:

1. A remote sensing system comprising:
   a plurality of remote sensors, each sensor of the plurality of sensors including:
      a sensing device that determines a value of a parameter being sensed, and
      a transmitter that emits a communications signal in dependence upon the value of the parameter being sensed, and
   a satellite communications system that receives the communications signal from at least one sensor of the plurality of sensors and determines therefrom:
      the value of the parameter being sensed at the at least one sensor, and
      a location of the at least one sensor at a time when the at least one sensor emitted the communications signal.

2. The remote sensing system of claim 1, wherein the satellite communications system includes:
   at least one satellite that receives the communications signal and transmits a relayed signal based upon the received communications signal, and
   a ground station that receives the relayed signal and determines therefrom the value of the parameter being sensed and the location of the at least one sensor at the time when the at least one sensor emitted the communications signal.

3. The remote sensing system of claim 1, wherein:
   the satellite communications system includes a trigger transmitter that transmits a trigger signal,
   the at least one sensor further includes a means for receiving the trigger signal, and
   the transmitter emits the communications signal in further dependence upon receiving the trigger signal.

4. The remote sensing system of claim 3, wherein:
   the means for receiving the trigger signal is also a means of providing power to emit the communications signal from the at least one sensor.

5. The remote sensing system of claim 1, wherein:
   the satellite communications system includes a directional antenna that receives the communications signal from the at least one sensor when the at least one sensor is within a field of view of the directional antenna, and
   the satellite communications system determines the location in dependence upon an orientation axis of the directional antenna when the communications signal is received.

6. The remote sensing system of claim 1, wherein:
   the satellite communications system determines the location in dependence upon at least one of a time of receipt of the communications signal and a frequency of the communications signal.

7. The remote sensing system of claim 1, wherein the satellite communications system includes:
   a first satellite that receives the communications signal and transmits therefrom a first relayed signal,
   at least one second satellite that receives the communications signal and transmits therefrom an at least one second relayed signal,
   a control station that receives the first relayed signal and the at least one second relayed signal and determines therefrom the value of the parameter being sensed and the location of the at least one sensor at the time when the at least one sensor emitted the communications signal.

8. The remote sensing system of claim 1, wherein the sensing device of the at least one sensor also provides power to emit the communications signal.

9. The remote sensing system of claim 1, wherein:
   the at least one sensor also includes a means for determining the location, and a means for encoding the location within the communications signal, and,
   the satellite communications system determines the location by decoding the location from within the communications signal.

10. A remote mapping system, comprising:
    a plurality of transmitters that are each located within an area of interest, each transmitter of the plurality of transmitters produces a transmission signal having a transmission signature,
    wherein the transmission signature of at least one transmitter of the plurality of transmitters is substantially the same as the transmission signature of at least one other transmitter of the plurality of transmitters; and a satellite communications system including:
- a receiver that receives the each transmission signal from each transmitter of the plurality of transmitters, and
- a processor that processes the each transmission signal from the plurality of transmitters and determines a location associated with the each transmission signal within the area of interest to facilitate a mapping based upon the location associated with the each transmission signal within the area of interest.

11. The remote mapping system of claim 10, wherein the satellite communications system further includes:
- an antenna having a field of view that is smaller than the area of interest, and
- a means for sweeping the antenna about the area of interest;
- wherein the receiver is operably coupled to the antenna to receive the each transmission signal from the each transmitter of the plurality of transmitters when the each transmitter is within the field of view of the antenna.

12. The remote mapping system of claim 10, further including
- a plurality of sensing devices, each sensing device of the plurality of sensing devices being operably coupled to the each transmitter of the plurality of transmitters, such that the transmission signal from the each transmitter is dependent upon a value of a parameter that is sensed by the each sensing device.

13. The remote mapping system of claim 12, wherein the value of the parameter corresponds to a measure of at least one of thermodynamic properties, transport properties, electromagnetic fields, flux strengths, spectral properties, radiation, moisture content, chemical composition, acceleration, and motion.

14. The remote mapping system of claim 12, wherein:
- the sensing device of at least one sensor of the plurality of sensors provides power to transmit the transmission signal.

15. The remote mapping system of claim 10, wherein:
- the satellite further includes a trigger transmitter that transmits a trigger signal,
- each transmitter of the plurality of transmitters further includes a means for receiving the trigger signal, and
- the each transmitter transmits the transmission signal in further dependence upon the trigger signal.

16. The remote mapping system of claim 10, wherein:
- the means for receiving the trigger signal provides power to transmit the transmission signal.

17. The remote mapping system of claim 10, wherein the transmission signal is an emission of light energy.

18. A method for in situ remote sensing comprising the steps of:
- distributing a plurality of sensing devices about an area of interest,
- sensing an each parameter value corresponding to each sensing device of the plurality of sensing devices,
- transmitting an each communications signal from the each sensing device in dependence upon the corresponding each parameter value,
- receiving the each communications signal from the each sensing device via a satellite, and
- determining an each location of the each sensing device based upon receiving the each communication signal from the each sensing device at the satellite, the each location of the each sensing device being the each location of the each sensing device within the area of interest when the each sensing device transmitted the each communications signal,
- thereby facilitating a mapping of the each parameter value to the each location within the area of interest.

19. The method of claim 18, further including the steps of:
- transmitting a trigger signal from the satellite,
- receiving the trigger signal at at least one of the plurality of sensing devices, and
- transmitting the communications signal from the at least one sensing device in further dependence upon receiving the trigger signal.

20. The method of claim 18, further including the step of
- scanning the area of interest via a directional antenna on the satellite by changing an orientation of the directional antenna, such that the each communication signal is received from the each sensing device when the each sensing device is within a field of view of the directional antenna that is determined by the orientation of the directional antenna; and,
- the step of determining the each location of the each sensing device is based on the orientation of the directional antenna.

* * * * *